Nov. 5, 1940.    F. BRONS    2,220,509
PROCESS AND APPARATUS FOR EXPLORING GEOLOGICAL STRATA
Filed Jan. 30, 1940
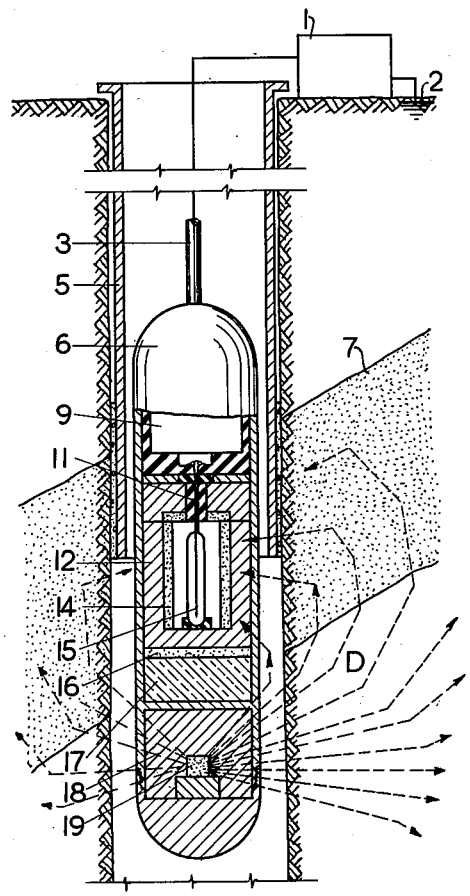
Fig. I
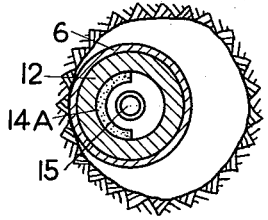
Fig. II
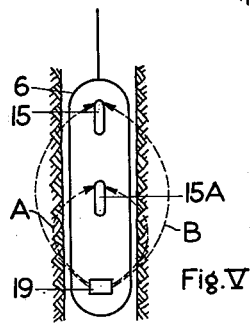
Fig. V
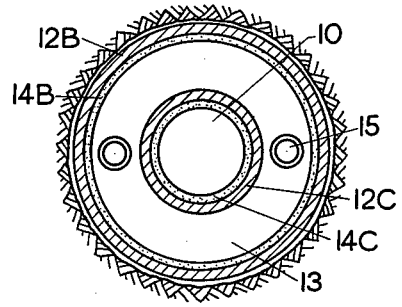
Fig. IV
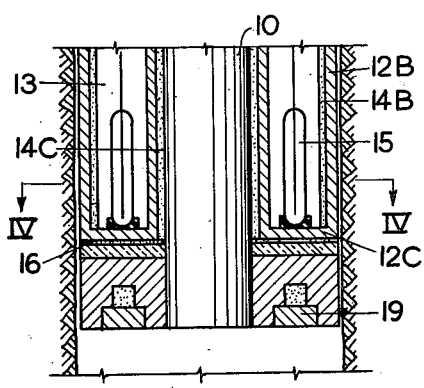
Fig. III
Inventor: Folkert Brons
By his Attorney Patented Nov. 5, 1940

2,220,509

UNITED STATES PATENT OFFICE 2,220,509

PROCESS AND APPARATUS FOR EXPLORING GEOLOGICAL STRATA

Folkert Brons, Kilgore, Tex., assignor to Shell Development Company, San Francisco, Calif., a corporation of Delaware Application January 30, 1940, Serial No. 316,352
In the Netherlands February 9, 1939

11 Claims. (Cl. 250—83)

This invention relates to methods of geophysical exploration, and pertains more particularly to radiological methods for determining the nature and/or the characteristics of underground formations.

It is known that various ground layers contain small concentrations of radio-active elements, such as radium, uranium, thorium, rubidium and others.

It is also known that various substances present in ground formations such as ores, water, mineral oil, etc., possess different capacities for passing, absorbing or storing radio-active energy.

It has heretofore been proposed to apply radiological methods for purposes of mineralogical surveys, geophysical exploration or logging of boreholes, whereby different ground strata could be identified or at least differentiated from each other. These methods consist in detecting, by means of suitably sensitive devices, such, for example, as ionization chambers or Geiger-Muller counters, either the primary radiations emanating from the natural radio-active substances present in the formations, or the secondary radiations emanating from said formations by reason of their having been activated, energized or super-charged by means of special operations involving the use of a natural or an artificial source of radio-active energy.

The main drawback of this last type of radiological exploration lies in the difficulties encountered in properly energizing the formations or in storing therein an amount of radio-active energy sufficiently high to be susceptible of quantitative detection by the apparatus provided for this purpose, whereby a basis would be afforded for the desired process of differentiation of ground strata.

It is, therefore, the object of this invention to provide a method and an apparatus for ground exploration involving the use of a source capable of radiating energy in the form of neutron rays, and of a detector sensitive to the diffusion and disintegration effects particular to said rays, said method being based on the peculiar behavior of the various elements present in the ground or associated with said apparatus with regard to said neutron rays.

Neutron rays may be generated when the rays emitted by a radio-active element such as radium, radon, polonium and some others, are made to act on certain elements such as beryllium, lithium, boron and some others, or their compounds or mixtures, with each other or with other elements, such for example, as boron oxide, which emit neutrons as a consequence of this action. These last-named elements also emit neutrons when subjected to bombardment with charged particles, such as alpha particles, protons or deutrons, which have been emitted or accelerated by means of a device such as a discharge tube or by the influence of electric or magnetic fields.

The neutrons formed in these processes possess great velocities, averaging between $1 \times 10^6$ and $10 \times 10^6$ electron volts, and easily penetrate through thick layers of all possible substances. This is due to the fact that the neutron has no charge, so that interaction with an atom nucleus takes place only by actual collision. In these collisions, the neutron loses comparatively little energy. Only in an elastic collision with atomic nuclei of low atomic weight elements, and especially with the hydrogen nucleus, which has the same mass as the neutron, does the neutron lose a large part of its energy, owing to which its energy is ultimately reduced to the order of magnitude of the heat motion of the molecules.

The neutron rays, therefore, possess the property of passing substantially without hindrance through heavy elements, that is, the elements of high atomic weight, such for example, as lead, although a suitable, though relatively small thickness, of the latter substance is practically impervious to rays of other types, such as alpha, beta and even to gamma rays. Lead and similar substances may, therefore, be used as a screen or filter for the separation of neutron and other types of radiation.

On the other hand, light elements, that is, those of low atomic weight, interact with the neutrons to a greater degree, as a result of which the neutrons are spread in every direction, and their velocity is greatly diminished. This diffusion phenomenon greatly increases with decreasing atomic weights of the elements, and is especially conspicuous in the presence of hydrogen, which may thus be sharply distinguished from the other elements, while the differences in the quantities of hydrogen present in different bodies of matter can also be readily observed by their effect on the passage of neutron rays.

The detection of diffused neutrons and the determination of the extent or degree to which the diffusion in a formation under exploration has taken place may be accomplished in several ways according to the present invention.

Thus, the neutrons, after their passage through the body of matter under exploration, may be made to act on materials carried in suitable association with the detecting device proper, said materials containing elements such as cadmium, lithium, rhodium, boron, silver, and some others, or their mixtures, which disintegrate under the influence of neutrons. In this connection, advantage may be taken of the fact that the neutron rays diffused by the light elements in the formation have had their velocity greatly diminished, and thus have an especially intensive effect on said disintegrating elements. For example, cadmium strongly absorbs these slow neutrons, simultaneously emitting gamma rays. Rhodium becomes beta-active, with a half-value time of 44 seconds. Boron (or $B_2O_3$) and lithium absorb slow neutrons, simultaneously emitting alpha rays.

The quantity of the disintegration products may then be ascertained by means of a suitable detecting device, such as an ionization chamber, a Geiger-Muller counter, or any other type of ionization counter sensitive to the effect of the ionizing particles generated by said disintegration process.

The ways in which the present invention may be applied for purposes of geophysical exploration will be understood from the following description taken with reference to the affixed drawing, wherein:

Fig. 1 shows a diagrammatic vertical cross-section view of a device embodying the present invention, said device being used for logging wells;

Fig. 2 is a horizontal cross-section view taken through the central portion of a somewhat modified device generally similar to that of Fig. 1;

Fig. 3 is a partial vertical cross-section view of a well-logging device provided with an axial fluid passage;

Fig. 4 is a horizontal cross-section view taken along line IV—IV of Fig. 3; and

Fig. 5 is a schematic diagram of an embodiment of the present invention wherein two detectors are mounted in the same housing.

Referring to the drawing, reference will be made for purposes of description to devices particularly adapted for the radiological logging of wells, although it is understood that the present method is applicable to any type of geophysical exploration, wherein surveying is effected either by means of exploratory boreholes, or by operating the device of the present invention in any desirable way in the proximity of the formations whose nature or characteristics are to be ascertained.

Referring to Fig. 1, the drawing shows diagrammatically a borehole, which may be cased as indicated at 5, or uncased, as indicated in the lower portion of the drawing. A relatively thin housing 6 made of a suitable material such as steel, brass, aluminum, etc., is lowered into the borehole on an insulated conductor cable 3, connecting the electrically operated devices within the housing with the necessary indicating, recording and power-supply apparatus at the surface, which apparatus is generally indicated at 1 and may be provided with a ground 2.

The housing 6 contains a source of neutrons 19, such for example, as a radium-beryllium preparation, which may be enclosed in a container made of a suitable material, such as glass. Instead of a radium-beryllium preparation, the source of neutrons may comprise, for example, a discharge tube adapted to bombard a beryllium or lithium composition with deutrons, thus causing a generation of neutrons in a manner understood by those familiar with the electrical arts.

The neutron source 19 is surrounded by a jacket 18 made of a material such as lead, which, as explained above, allows the neutron rays to pass completely or for the greater part therethrough.

The housing 6 comprises also a detector 15, such as a Geiger-Muller counter of an ionization chamber, encased in a holder or screen 12, likewise made of a material which allows the passage of neutron rays only, but checks other rays capable of directly affecting the counter or chamber 15. The inside wall of the screen 12, or the wall of the counter, is covered with, or supports, a composition or materials consisting of or comprising elements, such as cadmium, which have the property of disintegrating when exposed to the action of neutrons and especially of slow neutrons, that is, of neutrons whose velocity has been reduced by passage through a medium comprising low atomic weight elements such as hydrogen. This disintegrating material is shown at 14, and forms, together with the counter or chamber 15, an essential component part of the detector of the present invention.

To shield the detector 14—15 from the direct action of the neutron, source 19, there is interposed therebetween a protective shield comprising, for example, a layer or disk 17 made of solid hydrocarbons such as paraffin wax, said disk being covered on its upper side with a layer of cadmium, boron or other suitable substances, as shown at 16. The velocity of the neutron rays emanating upwards from the source 19 is reduced to such an extent by their passage through the hydrocarbon body 17 that on reaching the cadmium layer, they are absorbed therein and bring about its disintegration. The products of disintegration, however, cannot affect the counter or chamber 15, since they are in turn unable to penetrate through the lead holder or screen 12, enclosing said counter.

The housing 6 further contains one or more amplification stages diagrammatically indicated at 9, whereby the signals from the detector may be suitably amplified before being transmitted through cable 3 to the surface amplifying, indicating or recording apparatus generally shown at 1. The cable 3 may comprise a plurality of conductors, or a single conductor, in which case suitable filtering circuits are associated, in a manner understood by those familiar with the art, with the amplifier circuits to separate the signals sent to the surface by the detector from the operating voltages supplied from the surface to the housing 6.

In operation, the neutron rays generated by the source 19 penetrate the formation surrounding the borehole, and are diffused therein to a degree substantially depending on the quantity of the free or bound hydrogen present in the formation, their velocity being likewise decreased as a function of the hydrogen concentration in the formation.

A portion of the diffused neutrons is scattered back to the housing 6, as schematically shown by broken lines at D, and penetrates through the lead screen 12 surrounding the counter or chamber 15, acting to disintegrate the cadmium layer 14. The extent to which diffusion has taken place in the formation is then determined in well-known manner as a function of the effect of the disintegration products on the ionization chamber or counter 15.

When the housing 6 is lowered into a borehole at a suitable rate, the number of impulses registered by the present apparatus is a function of the character or nature of the formations traversed by the borehole, or of their oil or water content. Although the influence of said water or oil content on the number of impulses is a complex phenomenon, it may be generally said here, for purposes of illustration, that, for example, a great number of current impulses is registered when the apparatus passes through strata containing considerable quantities of oil, while a smaller number of impulses is registered when it passes through gas-bearing strata, or strata containing small quantities of oil. In a similar way, water-bearing layers give characteristic indications depending on their saturation, whereby it becomes possible to determine differences in the water content of various layers.

The process of the present invention may, if desired, be carried out during the drilling operations, for example, by affixing the present apparatus to the drill pipe. In order to eliminate or to minimize the influence of the hydrogen of the drilling fluid, care should be taken to avoid passing the neutron rays through relatively thick layers of drilling fluid previous to their entering the formation in order to prevent premature diffusion in said drilling fluid. The same is true with regard to runs in wells filled with a hydrogen containing fluid other than water, for example, oil. For this purpose, the present apparatus may be moved along the borehole or casing wall, the construction of the detector being in such case modified in that regard that the layer comprising the cadmium composition 14 is used to face only approximately one-half of the inner cylindrical surface of the screen or holder 12, namely, that half which lies in the direction of that portion of the borehole wall along which the apparatus is moved, as shown in Fig. 2. In this manner, the neutron rays diffused in the drilling fluid, after passing through the lead screen 12 are unable to affect the counter 15 for lack of material disintegrating under their action. On the other hand, the neutrons diffused in the formation, after passing through the screen 12, act to disintegrate the semi-cylindrical cadmium layer 14a, the disintegration products being registered as before by the counter 15.

As shown in Figs. 3 and 4, it is also possible to construct the apparatus of the present invention with a diameter nearly approximating that of the borehole, casing or tubing string through which it is to be lowered, in which case a central bore 10 is provided in the housing 6 to permit passage of the drilling fluid therethrough. One or a plurality of neutron sources 19 and/or counters or chambers 15 may be used, as shown. Instead of using an annular space to house the counter 15, as shown in Figs. 3 and 4, the counter itself may be given an annular form. The outer wall of the housing 6, and more particularly, of that portion thereof forming the annular space 13 containing the detector, is provided with an outside annular layer 12B of lead or similar material, and an inside annular layer 14B of cadmium or similar material. The inner wall of housing 6, that is, the wall forming the axial passage 10, is provided with an outside annular layer 14C of cadmium or similar material, and an inside annular layer 12C of lead or similar material, the layers 12B and 14C being, if desired, protected by suitable sheeting from direct contact with the well fluids and other outside substances. Identical shielding means 16 and 17 are provided, as in the embodiment of Fig. 1, to eliminate a direct action of the source 19 on the detector.

In this manner, the neutrons radiating from source or sources 19 and diffusing in the mud-flush within the central bore 10 do not affect the counter or chamber 15, since, after having their velocity reduced by the action of the hydrogen of the drilling fluid, they act to decompose the cadmium of the layer 14C, and are neutralized thereby, the products of disintegration being unable to reach the counter or chamber 15 through the inner lead layer 12C. The neutrons diffusing through the formation, however, pass through the outer lead layer 12B and disintegrate the cadmium layer 14B, thereby giving rise to rays capable of affecting the ionization chamber or counter 15.

Since fluctuations in the hydrogen content or in the amount of the hydrogen present in the surrounding fluid column, due, for example, to variations in the diameter of the borehole, may in some cases have a disturbing effect on the indications of a detector, it may sometimes be preferable to use an apparatus with two or more detectors mounted in one housing, as schematically shown in Fig. 5, wherein two detectors, 15 and 15A, are held in the housing or casing 6 at different distances from the source of neutrons 19. Since the paths of neutron travel, diagrammatically indicated on the drawing at A and B, are different for the two detectors, it will be obvious that the influence of the borehole liquid will be relatively greater with regard to the indications of detector 15A than with regard to those of detector 15, whereby the effect of the above-mentioned irregularities may be balanced out by proper adjustment or calibration of the device.

I claim as my invention:

1. In a method of geophysical exploration, the steps of generating neutron rays, causing said rays to pass through a ground formation, allowing said rays to undergo diffusion by interaction of the neutrons with low atomic weight elements present in the formation, causing the diffused neutrons to act on an element disintegrating under the effect of neutrons, whereby said element is disintegrated, and determining the amount of the disintegration products formed by the action of the neutrons on said element.

2. In a method of geophysical exploration, the steps of generating neutron rays, causing said rays to pass through a ground formation, allowing said rays to undergo diffusion by interaction of the neutrons with low atomic weight elements present in the formation, causing the diffused neutrons to act on an element disintegrating under the effect of neutrons, said element being selected from the group consisting of cadmium, lithium, rhodium, boron, and silver, whereby said element is disintegrated, and determining the amount of the disintegration products formed by the action of the neutrons on said element.

3. In a radiological method for well logging, the steps of lowering into a borehole a source of neutron rays, an element disintegrating under the action of neutrons and an ionization counter, shielding said counter from the direct neutron rays from said source, causing the neutron rays to pass through the formation traversed by the borehole, allowing said rays to undergo diffusion by interaction of the neutrons with low atomic weight elements present in the formation, subjecting said disintegrating element to the action of the diffused neutrons, and determining by means of said counter the amount of disintegration products formed by the action of the diffused neutrons on said element.

4. In a radiological method for well logging, the steps of lowering into a borehole containing a fluid a source of neutron rays, an element disintegrating under the action of neutrons, and an ionization counter, passing neutron rays through the formation and through the borehole fluid, allowing said rays to undergo diffusion by interaction of the neutrons with low atomic weight elements present in the formation and the borehole fluid, subjecting said disintegrating element to the action of the neutrons diffused in the formation, shielding said element from direct neutron rays from said source, shielding said element from neutron rays diffused in the borehole fluid, and determining by means of said counter the amount of disintegration products formed by the action of the neutrons diffused in the formation on said element.

5. In an apparatus for the radiological exploration of ground formations, a source arranged to radiate neutron rays through the formation, at least two detectors mounted at unequal distances from said source, each of said detectors comprising a substance disintegrating under the action of the neutron rays diffused in the formation and detecting means exposed to the effects of the products of said disintegration for indicating the extent of the diffusion occurring in the formation.

6. In an apparatus for the radiological exploration of ground formations, a source arranged to radiate neutron rays through the formation, a detector comprising a substance disintegrating under the action of the neutron rays diffused in the formation and electrical detecting means exposed to the effect of the products of said disintegration and capable of generating electric currents in response thereto, means for supplying operating electrical energy to said detector, and indicating means for observing the electric currents generated by said electrical detecting means under the effect of said disintegration products.

7. In an apparatus for the radiological exploration of ground formations, a housing comprising a source arranged to radiate neutron rays through the formation, a detector comprising a substance disintegrating under the action of the neutron rays diffused in the formation and an ionization counter exposed to the effect of the products of said disintegration and capable of generating electrical impulses in response thereto, shielding means impervious to neutron rays interposed in said housing between said source and said detector, means for supplying operating electrical energy to said counter, and indicating means for observing the electrical impulses generated by said counter under the effect of said disintegration products.

8. In an apparatus for the radiological exploration of ground formations, a housing comprising a source arranged to radiate neutron rays through the formation, said source comprising a radio-active substance and a substance emitting neutrons under the effect of radio-active radiation, said substance being selected from the group consisting of beryllium, boron and lithium, a detector comprising a substance disintegrating under the action of the neutron rays diffused in the formation, said substance being selected from the group consisting of cadmium, rhodium, lithium, boron, and silver, and an ionization counter exposed to the effect of the products of said disintegration and capable of generating electrical impulses in response thereto, shielding means impervious to neutron rays interposed in said housing between said source and said detector, means for supplying operating electrical energy to said counter, and indicating means for observing the electrical impulses generated by said counter under the effect of said disintegration products.

9. In an apparatus for the radiological exploration of ground formations, a housing comprising a source arranged to radiate neutron rays through the formation, said source comprising a tube emitting radio-active radiation and a substance exposed to the effect of said radiation and emitting neutrons in response thereto, a detector comprising a substance disintegrating under the action of the neutron rays diffused in the formation and an ionization counter exposed to the effect of the products of said disintegration, shielding means impervious to neutron rays interposed in said housing between said source and said detector, means for supplying operating electrical energy to said counter and said tube, and indicating means for observing the electrical impulses generated by said counter under the effect of said disintegration products.

10. In an apparatus for the radiological logging of boreholes, a housing adapted to be lowered into a borehole, said housing comprising a source arranged to radiate neutron rays into the formation, a detector comprising a substance disintegrating under the action of the neutron rays diffused in the formation and an ionization counter exposed to the effect of the products of said disintegration and capable of generating electrical impulses in response thereto, shielding means impervious to neutron rays interposed in said housing between said source and said detector, means to amplify the impulses of the counter, means for supplying operating electrical energy to said counter and said amplifying means, means for relaying to the surface the amplified impulses generated by said counter, and indicating means at the surface for observing said impulses.

11. In an apparatus for the radiological logging of fluid-filled boreholes, a housing adapted to be lowered into a borehole, said housing having a diameter not substantially smaller than the diameter of the borehole, an axial fluid passage through the housing, a source within the housing arranged to radiate neutron rays into the formation, an annular detector chamber within said housing, said chamber comprising a substance disintegrating under the action of neutron rays diffused in the formation and an ionization counter exposed to the effect of the products of said disintegration and capable of generating electrical impulses in response thereto, said chamber being separated from said axial bore by a wall comprising an annular layer of a substance disintegrating under the action of neutron rays, and an annular layer of a substance impervious to the products of said disintegration, said second layer being interposed between said first layer and said counter, shielding means interposed within said housing between said source and said detector, means to amplify the impulses of the counter, means for supplying operating electrical energy to said counter and said amplifying means, means for relaying to the surface the amplified impulses generated by said counter, and indicating means at the surface for observing said impulses.

FOLKERT BRONS.